Patented June 16, 1953

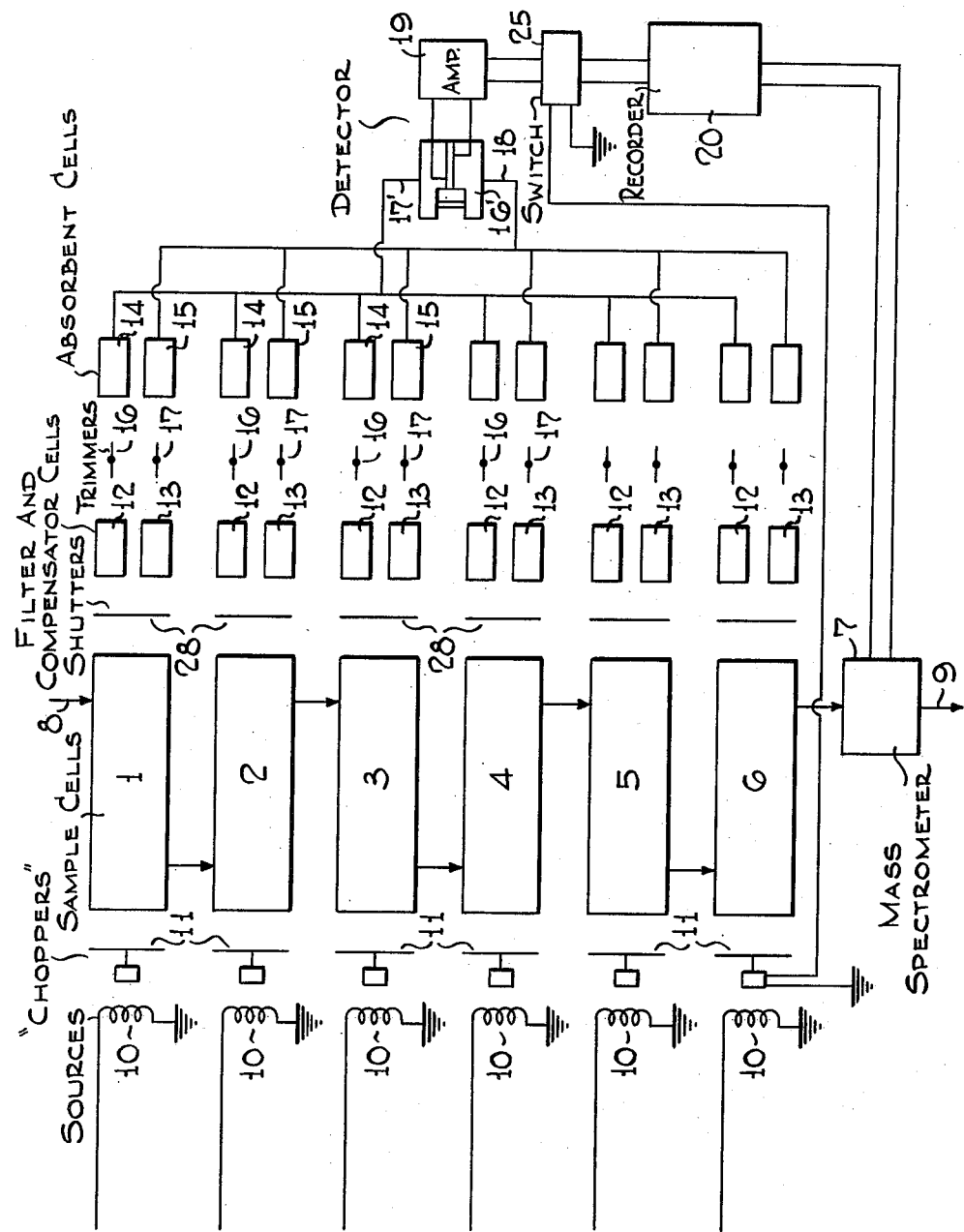

2,642,536

UNITED STATES PATENT OFFICE 2,642,536

MULTICOMPONENT GAS ANALYZER

John J. Heigl, Cranford, N. J., assignor to Standard Oil Development Company, a corporation of Delaware Application June 1, 1950, Serial No. 165,401

5 Claims. (Cl. 250—43.5)

This invention relates to improved apparatus for the quantitative analytical determination of the constituents present in a multicomponent gas mixture. In one embodiment of this invention, apparatus is provided to permit the infra-red characterization of any desired number of infra-red absorbing constituents of a gaseous mixture. In a further embodiment of this invention, this general type of apparatus is employed in combination with a mass spectrometer, to permit the quantitative determination of infra-red non-absorbing constituents as well.

This invention is related to the invention disclosed and claimed in U. S. patent application, Serial No. 31,346, filed by Charles W. Skarstrom on June 5, 1948. In the said application, improved infra-red analysis techniques are disclosed for the identification of any one infra-red absorbing gas in a mixture of gases. Thus, it is disclosed that infra-red analytical apparatus may be so sensitized as to selectively determine one constituent in a mixture of infra-red absorbing gases. Towards this end it is disclosed that two beams of infra-red radiation are to be employed. One beam passes through the sample cell and through what may be called a "filter cell" to impinge on one radiation detector. The second beam passes through a sample cell and through what may be called a "compensator cell" to impinge on a second radiation detector. In addition the apparatus contains light intensity controls adapted to variably control, as desired, the quantity of radiation in each of the beams. By connecting the two detectors in opposition and by providing suitable fluids in the filter and compensator cells, the differential detector output can be caused to depend solely on the concentration of a particular constituent contained in a sample mixture.

The general process and apparatus mentioned above is of particular application for the continuous analysis, or control of a process involving streams of hydrocarbon gases. However, it frequently happens that satisfactory control can only be obtained by the quantitative determination of more than one of the constituents present in a gas stream. When such information is required, it has heretofore been necessary to provide two infra-red analytical instruments of the character identified. Each of these instruments is then sensitized to permit the selective determination of one given component in the mixture to be analyzed. It is apparent, however, that the necessity for multiplying the analysis instruments in this manner is cumbersome, inefficient and expensive;—particularly in cases in which it is desirable, or necessary to determine 3, 4 or more components in a mixture. Consequently, it is the principal object of this invention to provide greatly simplified apparatus capable of simultaneously and continuously determining any desired number of infra-red absorbing constituents in a gas mixture.

It is apparent that the general infra-red analytical techniques referred to heretofore, are of no utility for the analytical determination of nonabsorbing gas constituents. Consequently, it is a further object of this invention to employ a mass spectrometer in combination with infra-red analytical apparatus so as to permit the complete determination of both infra-red absorbing, and non-infra-red absorbing constituents of a gas mixture. The combination of the spectrometer and the infra-red absorbing apparatus is particularly desirable, as it permits a simple and effective discrimination between certain gases which have similar molecular weights, but differing infra-red absorbing characteristics.

In accordance with this invention, therefore, infra-red analytical apparatus is provided having a plurality of sample cells. These sample cells are aligned with a plurality of filter and compensator cells, and a plurality of totally absorbent gas cells. The totally absorbent gas cells are pneumatically connected to a single detector, amplifier, and recorder. By providing means to periodically control the passage of infra-red radiation successively through each of the plurality of sample cells, it is possible to determine each of the infra-red absorbing constituents of a sample contained in, or passed through each of the sample cells. In addition the sample to be analyzed is preferably passed through a mass spectrometer, to provide information as to not only the molecular weights of gases in the mixture, but also certain non-infra-red absorbing gases and thus to provide total information making possible the complete analysis of the gas mixture.

This invention may be fully understood by reference to the accompanying drawing which diagrammatically illustrates apparatus embodying the principles of this invention. The apparatus illustrated is suitable for identifying the constituents of a gas mixture containing as many as six different infra-red absorbing gases, and in addition containing any number of non-absorbing gases.

As illustrated, the apparatus includes six sample cells, 1 to 6, associated with the infra-red characterization portion of the apparatus. In addition a further sample cell is associated with the mass spectrometer diagrammatically indicated by the numeral 7. For the continuous analysis of a gas sample, gas is introduced to the system through line 8 and passes in series through each of the sample cells for eventual removal from the system through outlet 9 of the mass spectrometer 7. Associated with each of the sample cells, 1 through 6, is a source of infra-red energy, a rotating radiation blocking means, a filter cell, a compensator cell, and gas cells capable of substantially completely absorbing infra-red radiation reaching these cells. Thus, a filament 10 suitable for emitting infra-red radiation is positioned adjacent to and aligned with each of the sample cells. The filament 10 is preferably in the form of a spiral adapted to emit a substantially uniform concentration of infra-red energy over the area defined by the ends of the sample cells. Positioned between the filament 10, and the adjacent sample cell, is a "chopper." This device may simply be a circular opaque plate provided with cutaway segments. This plate is rotated at a constant speed, for example, by means of a synchronized motor so that light is permitted to pass through the segments of the plate to reach the sample cell at a frequency of about 6 to 10 cycles per second. By this means the infrared energy of the source 10 is caused to periodically pass through the sample cells.

Radiation from the filament 10 may be considered to pass through each sample cell in two beams; that is, an upper beam passing through the upper portion of the sample cell, and a lower beam passing through the lower portion of the sample cell. A filter cell 12 is positioned in the upper beam of radiation passing through each of the sample cells, while a compensator cell 13 is positioned in the lower beam of radiation passing through each of the sample cells. The filter and compensator cells are preferably of substantially identical construction so that each cell is of substantially the same cross-sectional area. Finally, the two beams of radiation having passed through the filter cell 12 or compensator cell 13 are directed towards the total absorption cells 14 and 15. Again, cells 14 and 15 are of similar construction and have identical cross-sectional areas.

It is to be understood that each of the cells heretofore described are provided with suitable infra-red transparent windows to permit the passage of infra-red energy through the cells. Thus, the cells may, for example, consist of rock salt, silver chloride, etc. It is preferred that light intensity controls 16 and 17 be positioned between the filter and compensator cells, and the totally absorbent cells. Thus, one light intensity control 16 may be positioned in the upper beam of radiation between the cell 12 and 14, while a second light intensity control may be positioned between cell 13 and 15 in the lower beam of radiation. The light intensity controls are simply opaque plates or shutters which may be so controlled as to vary the amount of radiation passing the controls, and reaching the cells 14 or 15.

Each of the cells 14 and 15 are connected to pneumatic lines leading to the single detector assembly identified by the numeral 16'. In particular, fluid lines leading from each of the cells 14 are connected to a manifold line associated with a gas line 17 on one side of the detector 16'. Similarly, gas lines lead from each of the cells 15 to a manifold line associated with a gas line 18 leading to the opposite side of the detector 16'. The detector 16' consists of a pressure detector of the condenser microphone type. This detector is sensitive to minute differences in pressure impressed across it by any differences in gas pressure existing in lines 17' and 18. As condenser microphone detectors of this character are well known to the art, no further description will be made of this element of the apparatus. The output of the condenser microphone detector 16' is conducted to an amplifier 19 which suitably amplifies the electrical output to operate a recorder 20.

As heretofore described, operation of the general apparatus described would result in the receipt of unintelligible signals from the detector and the recorder. To operatively employ the apparatus described, it is necessary that a sequence switching means be provided adapted to sequentially control radiation in conjunction with each of the sample cells 1 to 6. This may be done in a number of ways. One of the simplest is to employ a multicontact timing switch such as the timing switch 25 connected to the "choppers" 11 in such a manner as to periodically switch these "choppers" on and off. Thus, as illustrated, the timing switch 25 will operate to sequentially operate each of the "choppers" 11 associated with each of the sample cells 1 to 6. This will have the effect of causing pulsating infra-red energy to first pass through sample cell 1, to impinge on detectors 14 and 15 at a time during which no pulsating infra-red energy is passed through any of the other sample cells. After a short interval the switch 25 will then discontinue transmission of the pulsating infra-red energy through sample cell 1, and permit it to pass through sample cell 2, and in the same fashion for each of the other sample cells of the apparatus. The record of the detector outputs appearing on recorder 20 are preferably controlled by other contacts of the timing switch 25 to provide information as to which of the sample cells a particular portion of the record corresponds to. This may best be achieved by employing a recorder of the multipen type in which an individual pen will represent the output of each of the detectors associated with each of the sample cells.

It is possible to secure the necessary sequential operation in other manners. For example, shutters 28 may be operated so as to have the same effect.

In actually employing the apparatus described for analytical purposes, for example, in the analysis of a gas composition containing six infra-red absorbing gas constituents, the filter and compensator cells associated with each of the six sample cells will be sensitized for selective determination of one of the six gaseous components. Thus, for example, filter and compensator cells 12 and 13 associated with sample cell 1 will be sensitized for a constituent A contained in the mixture while the filter and compensator cells associated with sample cell 2 will be sensitized for a constituent B contained in the gas mixture. As known to the art, this entails placing the proper gaseous fluids in the filter and compensator cells so that the differential energy passing through the filter and compensator cells will be directly proportional to the concentration of the desired constituent. The procedure described in the aforementioned United States application is particularly adaptable to this sensitization. In this connection it is sometimes necessary to critically adjust the trimmers 16 and 17 associated with each of the sample cells. Again, it is sometimes desirable to provide an additional cell which may be called an "interference cell" positioned so that both of the beams of energy formerly referred to pass through the interference cell as well as through a given sample cell. Again, it is frequently desirable to critically adjust the length of the sample cell for the analysis of a given constituent, or to particularly choose the windows of the different cells.

It is a particular feature of this invention that the apparatus described may be so constructed as to permit convenient insertion, or removal of particular filter, compensator, or sample cells. The apparatus can readily be designed so that different cells may be removed and inserted while maintaining the necessary critical alignment essential in analysis apparatus of this type. Thus, it is convenient to provide standard filter and compensator cells containing fluids adapted for the sensitization of the system for different components in different gas mixtures. By this means the general apparatus illustrated in the drawing may readily be adapted to the analysis of a wide variety of gas systems.

As indicated, the infra-red system heretofore described is advantageously combined with a mass spectrometer 7. As a specific example of this combination, let it be assumed that it is desired to analyze a complicated gas containing several infra-red absorbing constituents and one or more gases which are not characteristically infra-red absorbent. In this case the infra-red portion of the apparatus can determined the percentages of infra-red constituents, while the mass spectrometer can be used to determine the concentration of the remaining constituents.

As is well known, certain gases of interest in the control of processes such as hydrogen, nitrogen, oxygen and others containing monatomic or diatomic molecules, possess no infra-red absorption properties. In this invention, these gases will be determined by the mass spectrometer, since their quantitative determination can be established by this means. This represents only one of three advantages in combining the mass and infra-red principles in a single analytical device. Another reason for this aforementioned combination resides in the fact that by combining both mass and infra-red principles, data can be obtained to establish the percentages of both nitrogen and carbon monoxide. In this case, the carbon monoxide can be determined by infra-red absorption. By applying an appropriate factor to the value of the mass 28 value, which is due to the summation of the carbon monoxide and nitrogen, a value for nitrogen alone can be established. This combining of appropriate values to achieve the desired result is done by electrical circuits so that no calculations by an operator are involved. Another advantage of employing combined data is to gain accuracy for certain analyses. For example, the unsaturated C-4 hydrocarbons can be determined with greater accuracy by infra-red than by mass spectrometry. In this case, obviously, the infra-red data would be utilized. Still another advantage obtained by the combined mass and infra-red method is gained since certain "type" analysis where the total number of molecules of a single molecular species is desired, in some cases infra-red is preferred (for example—olefin types) and in other cases mass spectrometry is preferred (total aromatics of each molecular weight range). Mass spectrometric principles are superior to infra-red, and would, therefore, be used, whenever the presence of small amounts of a constituent with a higher molecular weight is to be detected in a mixture of lower molecular weight material.

By means of the apparatus described heretofore, it is possible to secure a total analysis of infra-red absorbing and non infra-red absorbing constituents of a gaseous mixture. In addition to the advantages listed, this procedure is valuable in providing information as to "drift" of the apparatus components. Thus, electronic changes or changes in radiation intensity occurring after a passage of time will be indicated by failure of the analysis results to total 100%.

What is claimed is:

1. An improved detector assembly in apparatus for the multi-component infra-red determination of gaseous mixtures consisting of a plurality of infra-red absorbent cells, said cells being arranged in pairs in the path of radiation through a plurality of gas sample cells, one of each pair of absorbent cells being pneumatically connected to one side of a condenser microphone detector, while the other of the said pairs of absorbent cells is pneumatically connected to the other side of the said condenser microphone detector, and means to periodically control the impingement of pulsating infra-red energy on each of the pairs of the said absorbent cells whereby the said detector periodically indicates any differential in infra-red energy reaching each of the said pairs of cells.

2. Apparatus for the analysis of a multi-component gas sample comprising a plurality of sample cells, a source of infra-red radiation arranged to pass radiation through each of said sample cells, a first plurality of infra-red absorbent cells arranged in the path of radiation through each sample cell, and a second plurality of infra-red absorbent cells arranged in a different portion of the path of radiation through each sample cell, a condenser microphone detector, fluid lines between said detector and said absorbent cells, and means to periodically and sequentially permit impingement of radiation on the particular first and second absorbent cells in the path of radiation through each particular sample cell.

3. A multi-component analysis arrangement including in combination: a plurality of sample cells, a source of infra-red radiation arranged to pass a beam of radiation through each of said sample cells, a pair of infra-red absorbent cells arranged in different portions of the beam of radiation passed through each sample cell, a condenser microphone detector, pneumatic connections between one cell of each pair of absorbent cells and one side of said detector and pneumatic connections between the other cell of each pair of absorbent cells and the other side of said detector, and means to sequentially permit said beams of radiation to impinge on each pair of absorbent cells.

4. The arrangement defined by claim 3 in which a pair of optical cells are positioned in different portions of the said beam of radiation between each sample cell and each pair of absorbent cells.

5. The arrangement defined by claim 3 including means to periodically interrupt each of said beams of radiation to provide pulsating infrared radiation.

JOHN J. HEIGL.

References Cited in the file of this patent

UNITED STATES PATENTS

| Number | Name | Date |
|---|---|---|
| 2,212,211 | Pfund | Aug. 20, 1940 |
| 2,431,019 | Barnes | Nov. 18, 1947 |
| 2,496,333 | Cary et al. | Feb. 7, 1950 |

OTHER REFERENCES

Journal of Scientific Instruments, December 1946, page 293.

An Optical Acoustic Method of Gas Analysis, by P. J. Callisen—Nature—February 1, 1947, page 167.

Infra-Red Instrumentation and Techniques, by V. Z. Williams. Review of Scientific Instruments, March 1948, pp. 135-178, copy in Patent Office Library.